United States Patent
Pennisi

(10) Patent No.: US 8,035,498 B2
(45) Date of Patent: Oct. 11, 2011

(54) WIRELESS MONITORING SYSTEM WITH A SELF-POWERED TRANSMITTER

(76) Inventor: Terry Pennisi, Oak Ridge, TN (US)

(*) Notice: Subject to any disclaimer, the term of this patent is extended or adjusted under 35 U.S.C. 154(b) by 1034 days.

(21) Appl. No.: 11/835,541

(22) Filed: Aug. 8, 2007

(65) Prior Publication Data

US 2008/0042816 A1 Feb. 21, 2008

Related U.S. Application Data

(60) Provisional application No. 60/822,394, filed on Aug. 15, 2006.

(51) Int. Cl.
*G01P 3/487* (2006.01)
(52) U.S. Cl. .......... 340/441; 340/432; 340/426.16; 310/67 A; 324/166; 324/173; 324/174
(58) Field of Classification Search ............ 340/432, 340/441, 426.16, 445, 448; 180/205–206, 180/219; 310/67 A; 324/166, 173, 174, 324/207.15, 207.25

See application file for complete search history.

(56) References Cited

U.S. PATENT DOCUMENTS

| | | | |
|---|---|---|---|
| 3,887,273 A | 6/1975 | Griffiths | |
| 4,298,893 A * | 11/1981 | Holmes | 348/730 |
| 4,600,271 A | 7/1986 | Boyer et al. | |
| 4,711,544 A | 12/1987 | Iino et al. | |
| 4,788,497 A | 11/1988 | Katsummura | |
| 4,831,366 A | 5/1989 | Iino | |
| 4,868,652 A | 9/1989 | Nutton | |
| 4,925,272 A | 5/1990 | Ohshima et al. | |
| 4,972,122 A | 11/1990 | Daidouji et al. | |
| 4,988,976 A | 1/1991 | Lu | |
| 5,013,134 A | 5/1991 | Smith | |
| 5,202,668 A | 4/1993 | Nagami | |
| 5,584,561 A * | 12/1996 | Lahos | 310/67 A |
| 5,721,539 A * | 2/1998 | Goetzl | 340/870.3 |
| 5,825,338 A | 10/1998 | Salmon et al. | |
| 6,244,988 B1 * | 6/2001 | Delman | 482/8 |
| 6,992,413 B2 * | 1/2006 | Endo et al. | 310/67 A |
| 7,060,343 B2 | 6/2006 | Freeman | |
| 7,061,228 B2 * | 6/2006 | Ichida et al. | 324/174 |
| 7,165,641 B2 * | 1/2007 | Kitamura | 180/206 |
| 7,253,610 B2 * | 8/2007 | Nagae | 340/432 |

(Continued)

OTHER PUBLICATIONS

International Search Report (ISR) and Written Opinion (WO) for International Application No. PCT/US2009/030232, mailed date Feb. 27, 2009.

*Primary Examiner* — George Bugg
*Assistant Examiner* — Anne Lai
(74) *Attorney, Agent, or Firm* — Knox Patents; Thomas A. Kulaga

(57) ABSTRACT

A system with a self-powered sending unit communicating with a receiving unit. The sending unit interacts with a magnet attached to a rotating or moving member. The sending unit includes an inductor that intercepts the magnetic field from the magnet. The magnetic interaction with the sending unit generates power that is stored for later use by a transmitter. The magnetic interaction also provides a trigger for the transmitter that causes the transmitter to send a signal using the stored energy. In one embodiment, the signal includes a identification code that uniquely identifies the sending unit. A receiving unit includes a receiver responsive to the transmitted signal and, in one embodiment, a display of the measured parameter that is projected by a heads-up display unit.

20 Claims, 7 Drawing Sheets

U.S. PATENT DOCUMENTS

| | | | |
|---|---|---|---|
| 7,363,806 B2 * | 4/2008 | Huang et al. | 73/146 |
| 7,379,798 B2 * | 5/2008 | Takeda et al. | 701/29 |
| 7,408,447 B2 * | 8/2008 | Watson | 340/432 |
| 2002/0126391 A1 * | 9/2002 | Kushida et al. | 359/630 |
| 2005/0007239 A1 | 1/2005 | Woodard et al. | |
| 2005/0156590 A1 | 7/2005 | Nagae | |

* cited by examiner

WIRELESS MONITORING SYSTEM WITH A SELF-POWERED TRANSMITTER

CROSS-REFERENCE TO RELATED APPLICATIONS

This application claims the benefit of U.S. Provisional Application Ser. No. 60/822,394, filed Aug. 15, 2006.

STATEMENT REGARDING FEDERALLY SPONSORED RESEARCH OR DEVELOPMENT

Not Applicable

BACKGROUND OF THE INVENTION

1. Field of Invention

This invention pertains to a wireless monitoring system with a self-powered transmitter. More particularly, this invention pertains to a self-powered pulse transmitter monitoring a parameter and wirelessly transmitting information relating to that variable to a receiver, where the information is converted to information displayed to the operator, such as through a heads-up display for a vehicle.

2. Description of the Related Art

In the field of automobiles, it is well known that a driver must not only pay attention to the driving environment, but also upon the operating conditions of the vehicle itself. With respect to the driving environment, the driver must be aware at all times of the condition and direction of the roadway on which the driver is traveling, including weather conditions, traffic, and physical condition of the surface. With respect to operating conditions of the vehicle, it is important to monitor the speed of the vehicle and various vehicle parameters, such as the fuel level, oil pressure, and engine temperature.

However, there are certain external conditions in which it is difficult and dangerous to maintain eye contact with the driving environment and still monitor the operating conditions of the vehicle. Accordingly, devices are known for accomplishing both by projecting various vehicle parameters onto the windshield of the vehicle.

For example, U.S. Pat. No. 3,887,273, issued to Griffiths on Jun. 3, 1975, and titled "Speedometer optical projection system," discloses a system for projecting a speedometer or other instrument reading as a virtual image into the field of view of the vehicle operator. Griffiths discloses an optical projection system that corrects for aberrations from using the vehicle windshield as a projection screen for displaying the vehicle parameters.

U.S. Pat. No. 4,988,976 issued to Lu on Jan. 29, 1991, titled "Head-up display with magnetic field speed detecting means," discloses a heads-up display system for a vehicle. Lu also discloses an electromagnetic inducer disposed on a tire for calculating the speed of the vehicle regardless of the tire size.

BRIEF SUMMARY OF THE INVENTION

According to one embodiment of the present invention, a wireless monitoring system is provided. In one such embodiment, the wireless monitoring system is a wireless heads-up display system including a sending unit that senses a parameter of the vehicle, such as engine revolutions per minute (RPM) or the vehicle speed. In one embodiment, the sending unit includes a magnet positioned on a rotating or moving component of the vehicle, such as a fan belt pulley, flywheel, or drive shaft. The magnet is magnetically coupled to an inductor as the magnet moves past the inductor. The magnetic coupling induces a voltage spike in the inductor and the energy in the spike is stored, thereby making the sending unit self-powered. The energy from the magnet passing by the inductor is stored for powering the pulse transmitter. The moving magnet also actuates a magnetic sensor or switch that triggers the pulse transmitter and sends information to a receiving unit. The receiving unit includes an antenna and a receiver that, together, detect the information from the sending unit. In one embodiment, the receiving unit includes a display unit that provides information relating to the sensed vehicle parameter to an operator of the vehicle.

In one such embodiment, multiple sending units are employed, each one monitoring a different vehicle parameter and transmitting at a different frequency or with a different type of modulation. In one embodiment, the receiving unit includes a number of receivers equal to the number of sending units and the display unit provides the appropriate information to the operator.

In another such embodiment, multiple sending units operate at the same frequency, but each sending unit transmits a signal having a unique identification code. The receiving unit includes a single receiver that identifies the signal from each sending unit based on the identification code.

One embodiment of the wireless monitoring system includes a solar powered charging system for the receiving unit. In such an embodiment, the receiving unit includes a battery, one or more solar cells, and a charger. The solar cells provide power that charges the battery, which provides power to the receiving unit when the solar cells are not exposed to sufficient light to power the receiving unit.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for a self-powered wireless sending unit 100 incorporated in a wireless monitoring system 10 is disclosed. In one embodiment the wireless monitoring system 10 is a wireless heads-up display system configured to fit into a vehicle to provide vehicle parameter information to the operator.

Figure 1:
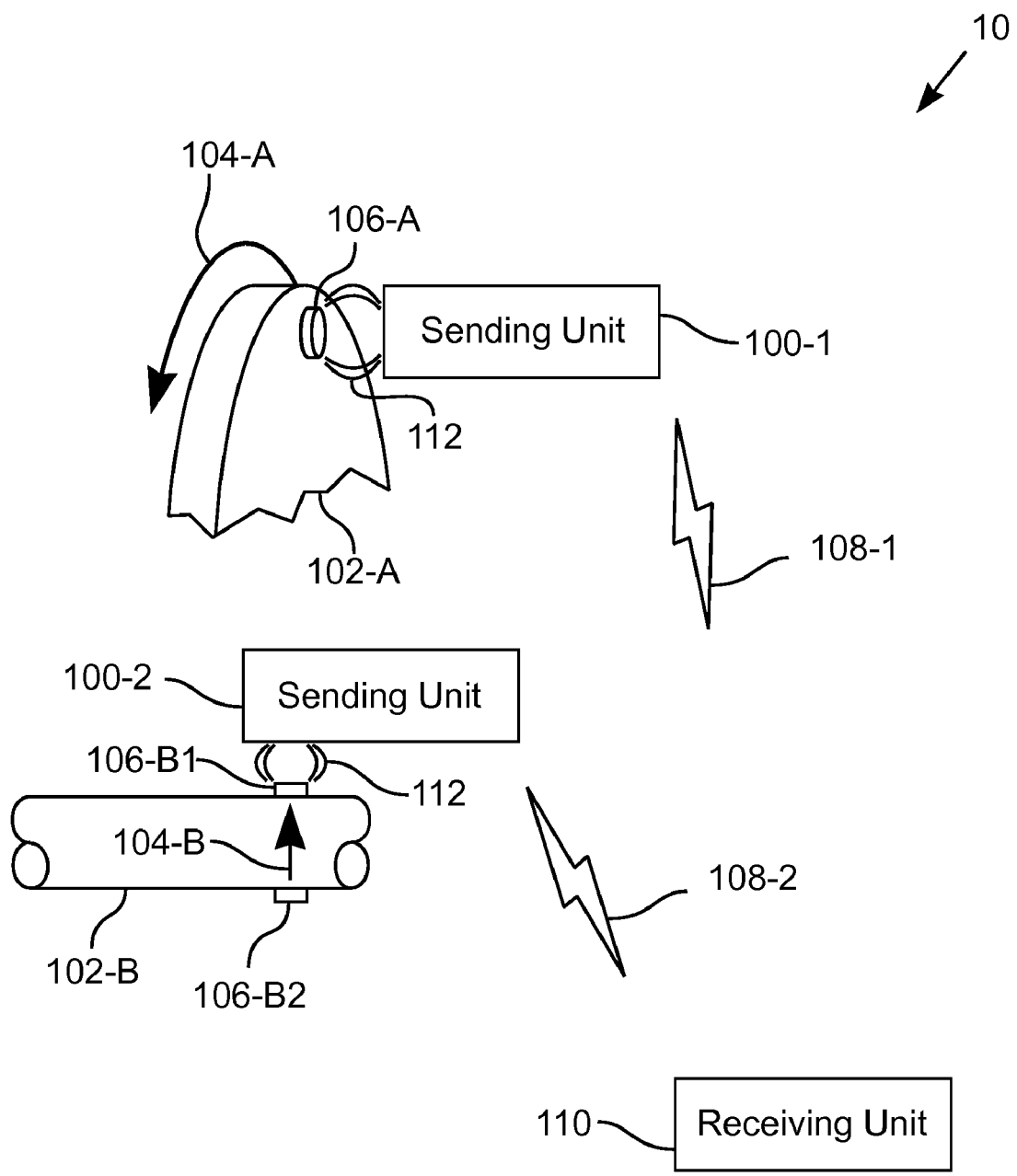
FIG. 1 is a simplified block diagram of one embodiment of a wireless heads-up display system.

FIG. 1 illustrates a block diagram of one embodiment of a wireless monitoring system 10. A first sending, or transmitting, unit 100-1 monitors a magnet 106-A attached to a rotating member 102-A, such as a flywheel or pulley. The rotating member 102-A rotates in a direction 104-A that moves the magnet 106-A past the first sending unit 100-1. The magnet 106-A has a magnetic field 112 that couples with the first sending unit 100-1 and causes the sending unit 100-1 to transmit a signal 108-1 to a receiving unit 110. With a single magnet 106-A attached to the rotating member 102-A, the signal 108-1 transmitted by the sending unit 100-1 is a pulse stream with a pulse transmitted for each revolution of the rotating member 102-A.

A second sending unit 100-2 is positioned proximate a pair of magnets 106-B1, 106-B2 attached to another rotating member 102-B, such as a driveshaft. The pair of magnets 106-B1, 106-B2 are positioned opposite each other. As each magnet 106-B passes by the second sending unit 100-2, the magnet's magnetic field 112 couples with the second sending unit 100-2 and causes the second sending unit 100-2 to transmit a signal 108-2 that is received by the receiving unit 110. Because the driveshaft 102-B has a pair of magnets 106-B, the signal 108-2 transmitted by the sending unit 100-2 has a pair of pulses for each revolution of the drive shaft 102-B.

In the illustrated embodiment, the magnets 106, through the magnetic field interaction with the sending units 100, provide the energy that powers the sending units 100. Also, the magnets 106 trigger the sending units 100 to transmit the signal 108 to the receiving unit 110.

In the illustrated embodiment, the number of sending units 100 is equal to the number of variables to be monitored and/or measured. For example, the first rotating member 102-A is a pulley attached to an engine in a vehicle. The pulley 102-A causes the sending unit 100-1 to send a pulse signal 108-1 each time the magnet 106-A is proximate the sending unit 100-1. The number of pulses per unit time in the signal 108-1 is directly related to the revolutions per minute (RPM) of the engine. The second rotating member 102-B is a vehicle driveshaft. The pair of magnets 106-B provide a pair of pulse signals 108-2 for each revolution of the driveshaft 102-B, and the number of pulses per unit time in the signal 108-2 is directly related to the speed of the vehicle. In other embodiments, the magnet 106 is attached to a moving component that moves in a cyclical or repetitive manner such that the magnet 104 repeatedly moves proximate the sending unit 100 at an interval that corresponds to some variable to be measured.

Figure 2:
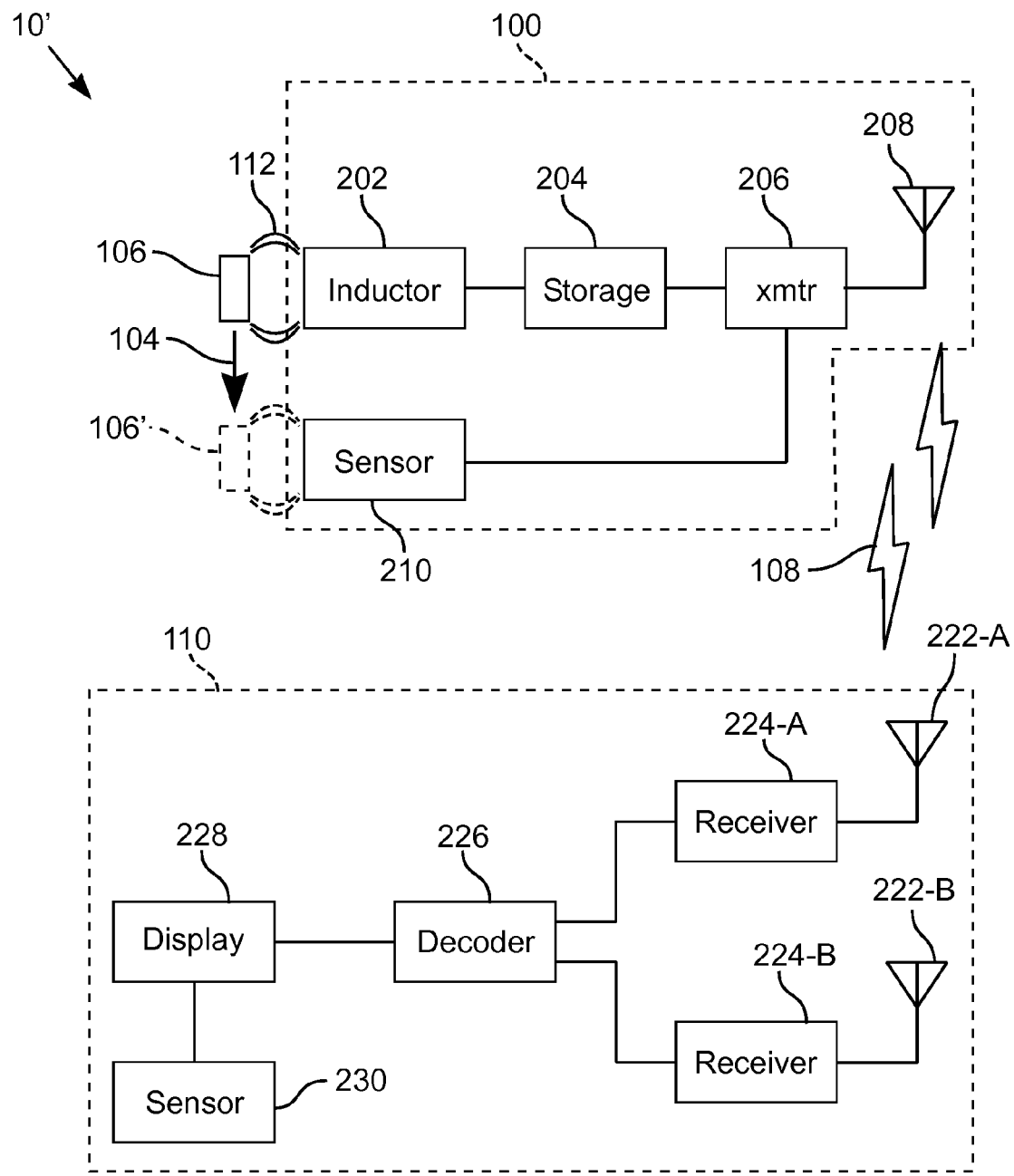
FIG. 2 is a block diagram of one embodiment of a wireless heads-up display system.

FIG. 2 illustrates a block diagram of one embodiment of a wireless monitoring system 10' that is a wireless heads-up display system. FIG. 2 illustrates only a single sending unit 100, but, as stated above, the number of sending units 100 varies with the number of parameters to be monitored/measured. A magnet 106 is attached to a moving component such that the magnet 106 sequentially and repeatedly moves in a direction 104 past an inductor 202 and a sensor 210. In one embodiment, the magnet 106 is attached to a pulley 102 that has a rotational speed directly related to the engine RPMs. When the magnet 106 is proximate the inductor 202 such that the magnetic flux 112 from the magnet 106 interacts with the inductor 202, a current is induced in the inductor 202. The energy represented by the induced current is stored in a storage device 204 and is made available to a transmitter (xmtr) 206, which is connected to an antenna 208.

The inductor 202 and the sensor 210 are positioned such that the sufficient energy is collected and stored before the magnet 106 is proximate the sensor 210. That is, the sensor 210 is positioned downstream of the inductor 202 so that, when the magnet 106 is proximate the sensor 210, the inductor 202 and magnet 106 interaction has generated sufficient power for the transmitter 206 to operate. The sensor 210 is a magnetic switch, for example a Hall-effect switch, a reed switch, or other magnet actuated switch. When the magnet 106 is proximate the sensor 210, the sensor 210 causes the transmitter 206 to use the energy in the storage device 204 to transmit a signal 108 from the antenna 208.

In the illustrated embodiment, the receiving unit 110 includes a pair of antennas 222-A, 222-B each receptive to a signal 108 from a corresponding one of a pair of sending units 100. Each antenna 222-A, 222-B is connected to a receiver 224-A, 224-B. The combination of each antenna 222-A, 222-B and receiver 224-A, 224-B is responsive to a specific frequency transmitted by a corresponding sending unit 100. For example, referring to FIG. 1, the first sending unit 100-1 operates at a first frequency and the second sending unit 100-2 operates at a second frequency sufficiently different from the first frequency to avoid crosstalk or other types of interference between the two signals 108-1, 108-2. In other embodiments, the receiving unit 110 includes a single receiver 224 that is responsive to signals 108 from multiple sending units 100, such as by receiving coded signals 108-B having the same frequency, but different identifying codes.

The receivers 224-A, 224-B provide signals to a decoder unit 226 that is connected to a display unit 228. The decoder unit 226 converts the received signal 108 into a value that represents the measured variable and provides that value to the display unit 228. In the illustrated embodiment of the wireless heads-up display system 10', the display unit 228 is a projection system that projects the value representing the measured variable onto a screen that is visible to the vehicle operator. A sensor 230 is connected to the display unit 228 to control the intensity of the projected image. In one embodiment the sensor 230 is a photocell or other type of photosensor that measures the level of ambient light. The output of the sensor 230 is used by the display unit 228 to adjust the intensity of the projected image to be bright when the ambient light is bright and to be dim when the ambient light is dim. In this manner the display unit 228 provides a display that is readily visible without distraction under varying light conditions.

Figure 3:
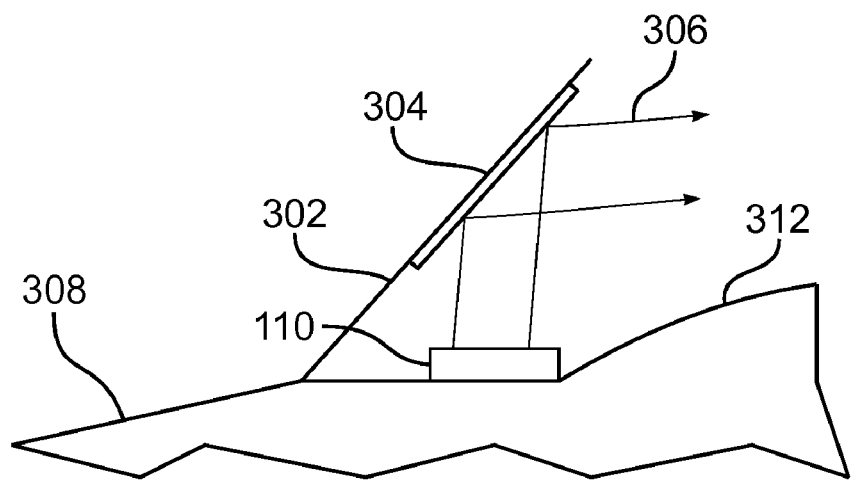
FIG. 3 is a side view of one embodiment of the projection portion of the receiving unit.

FIG. 3 illustrates a side view of one embodiment of the projection portion of the receiving unit 110. The wireless heads-up display system 10' includes a receiving unit 110 that is positioned on the portion of a dashboard 312 of a vehicle 308 that is adjacent the windshield 302. The display unit 228 in the receiving unit 110 projects an image 406 upward toward a screen 304 attached to the inside surface of the windshield 302. The projected display 306 is reflected from the screen 304 toward the vehicle occupant.

Figure 4:
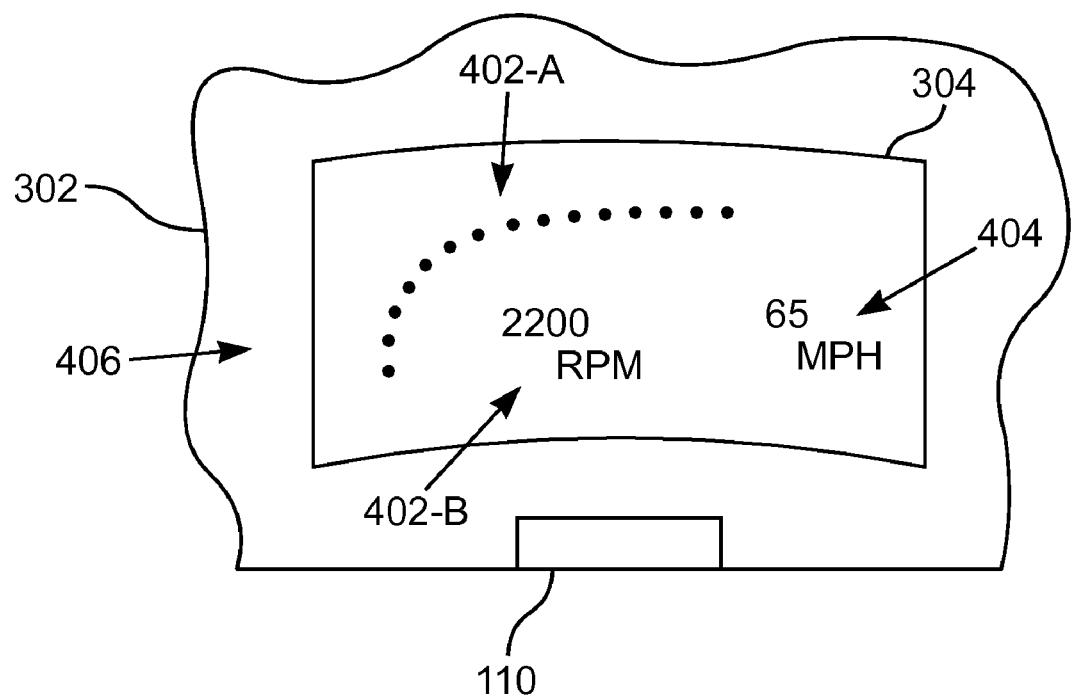
FIG. 4 is a view of one embodiment of a heads-up display as seen from the vantage point of the vehicle operator.

FIG. 4 illustrates a view of one embodiment of a heads-up image 406 as seen from the vantage point of the vehicle operator. The screen 304 in the illustrated embodiment has a roughly rectangular shape that is fitted to the curved inside surface of the windshield 302. The display unit 228 in the receiving unit 110 projects an image 406 onto the screen 304, and the image 406 is then reflected 306 toward the vehicle operator. In the illustrated embodiment, the image 406 includes a bar graph display 402-A representing graphically the engine RPMs, a numerical display 402-B representing the engine RPMs, and a numerical display 404 representing the vehicle speed. The displayed variables correspond to the variables measured by the sending units 100 and in various embodiments include various engine and vehicle parameters.

Figure 5:
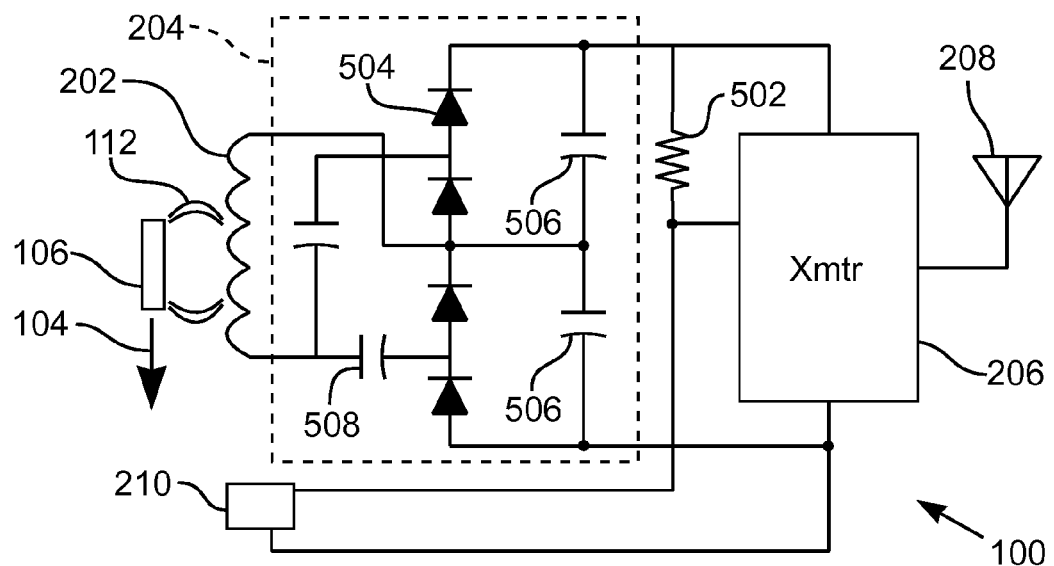
FIG. 5 is a simplified schematic of one embodiment of a sending unit.

FIG. 5 illustrates a simplified schematic of one embodiment of a sending unit 100. The simplified schematic does not illustrate various miscellaneous connections; however, those skilled in the art will recognize the need for such wiring and understand how to wire such a circuit, based on the components ultimately selected for use. The sending unit 100 includes an inductor 202 connected to a storage device 204 that provides power to a transmitter 206. The magnet 106 moves in a direction 104 that causes the magnet's flux 112 to induce a current in the inductor 202. The strength of the magnetic flux 112 and the speed of the magnet 106 as it moves past the inductor 202 influence the magnitude and shape of the induced current signal. In various embodiments, the voltage across the inductor 202 due to the induced current is selected by using a transformer or by adjusting the length of the inductor 202. In one embodiment, the inductor 202 has a length parallel to the magnet direction 104 that is sufficient to produce the desired power from the interaction of the inductor 202 with the magnetic field 112 of the magnet 106.

In the illustrated embodiment, the storage device 204 stores the energy from the interaction of the magnet 106 with the inductor 202. In the illustrated embodiment, the storage device 204 also includes a voltage multiplier that increases the voltage across the inductor 202 to a level suitable for use by the transmitter 206. The circuit of the storage device 204 includes a network of capacitors 506, 508 and diodes 504 that allow the charging of the capacitors 506 to store the energy induced in the inductor 202 without allowing the charge to drain back through the inductor 202 after the magnet 106 moves away from the inductor 202. The current induced in the inductor 202 results in a voltage across the capacitors 506 that represents the stored energy.

The voltage of the storage device 204 is applied to the transmitter 206, which is maintained in a standby condition until it is triggered by the sensor 210. The sensor 210 is positioned so that the magnet 106 passes by the sensor 210 after the magnet 106 passes the inductor 202. This positioning allows the energy from the magnet 106 to be stored and available when the magnet 106 actuates the sensor 210. In one embodiment, the sensor 210 is a normally closed magnet switch, which is connected between the data input of the transmitter 206 and ground. A pull-up resistor 502 is attached to the data input of the transmitter 206. When the magnet 106 is proximate the sensor 210, the sensor 210 causes an open circuit or a high impedance between the data input of the transmitter 206 and ground, which causes the data input of the transmitter 206 to receive a high level signal. The high level signal triggers the transmitter 206, which transmits a signal 108 through the antenna 208.

In one embodiment, the number of magnets 106 on the moving component 102 is based on the time interval between the successive magnetic interactions with the inductor 202 over the operating range of the parameter being measured. For example, to maintain a base charge in the storage device 204, a magnet 106 should interact with the inductor 202 before the energy in the storage device 204 is reduced to zero. For slowly rotating components, such as a vehicle drive shaft 102-B, two or more magnets 106-B are appropriate.

Figure 6:
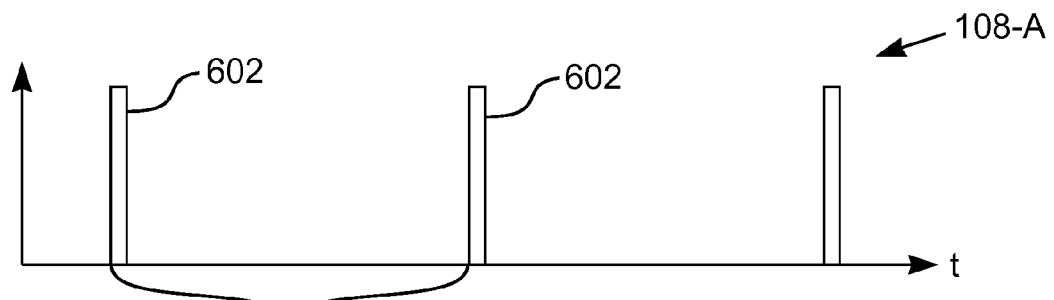
FIG. 6 is a diagram showing one embodiment of a transmitted signal.

FIG. 6 illustrates a diagram showing one embodiment of a transmitted signal 108-A. The transmitted signal 108-A is a pulse stream with a series of pulses 602 separated by a gap 604. Each pulse 602 represents a burst from the transmitter 206 when it is triggered by the magnet 106 actuating the sensor 210. The gap 604 is directly related to the time between actuations of the sensor 210. In the embodiment where only one magnet 106-A is positioned on a rotating member 102-A, the gap 604 represents the time required for the rotating member 102-A to make one revolution. In the embodiment where two magnets 106-B1, 106-B2 are positioned on a rotating member 102-B, the gap 604 represents the time required for the rotating member 102-B to make one-half revolution.

In one embodiment, the pulses 602 have a fixed width and a constant amplitude. In one embodiment, the power required to generate each pulse 602 is based on the energy in the storage device 204, thereby ensuring that the signal 108 has maximum strength.

Figure 7:
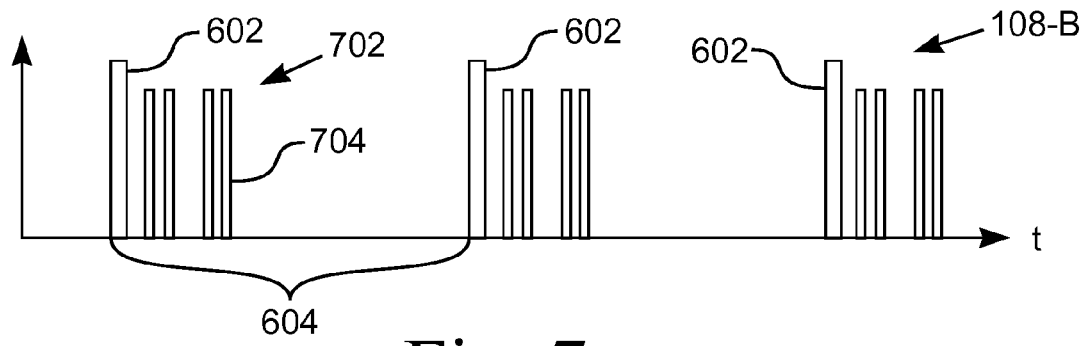
FIG. 7 is a diagram showing another embodiment of a transmitted signal.

FIG. 7 illustrates a diagram showing another embodiment of a transmitted signal 108-B. The transmitted signal 108-B is a pulse stream with a series of burst pulses 602 separated by a gap 604. The signal 108-B also includes a coded pulse stream, or a series of pulses, 702 that provide identification information, or an identification code, 704, unique to the sending unit 100. In the illustrated embodiment, the coded pulses 702 are sent with every burst pulse 602, although, in other embodiments, the coded pulses 702 follow every other, or some other multiple, burst pulse 602.

The coded pulse stream 702, in the illustrated embodiment, includes a series of pulses in which the number and the interval between the individual pulses provides information. For example, the coded pulse stream 702 in the illustrated embodiment represents the digital code 11011 because the presence or absence of each individual pulse represents the value of a bit.

The transmitter 206 in the sending unit 100 includes a microcontroller or other device that causes the transmitter 206 to output a pulse stream 108-B that includes the burst pulse 602 and the coded pulse stream 702. In various embodiments, the microcontroller includes firmware or accesses a switch that defines an identification code 704 that uniquely identifies the sending unit 100. When multiple sending units 100 are used, the transmitters 206 operate at the same frequency, but have different identification codes 704. The receiving unit 110 includes a single receiver 224 that monitors a frequency and receives the burst pulse 602 and the coded pulse stream 702. The decoder unit 226 uses the identification of the received signal 108, along with its relative time of receipt compared to other received signals 108 with the same identification code 704, to determine the value of the monitored parameter. Because the width of the burst pulse 602 and the coded pulse stream 702 is small relative to the gap 604, the probability of collisions between multiple signals 108 is low. A collision occurs when any part of two separate signals 108 overlap, that is, when any portion of the burst pulse 602 and the coded pulse stream 702 from two sending units 100 are received by the receiving unit 110 at the same time.

Figure 8:
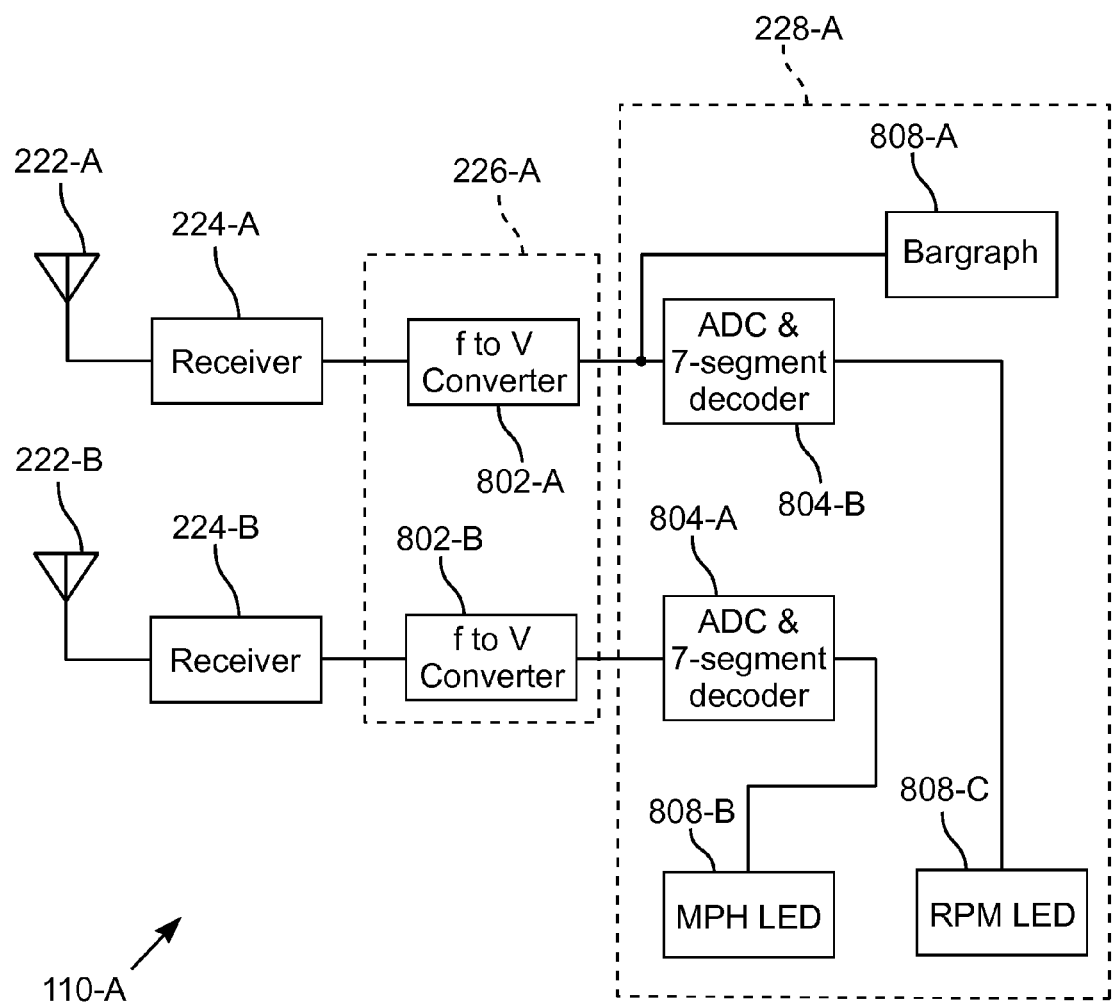
FIG. 8 is a block diagram of one embodiment of a receiving unit.

FIG. 8 illustrates a block diagram of one embodiment of a receiving unit 110-A that is responsive to a signal 108-A. The illustrated embodiment shows an analog decoder unit 226-A and an analog display unit 228-A. The analog decoder unit 226-A includes a pair of frequency to voltage converters 802-A, 802-B, each receiving an input from one of the receivers 224-A, 224-B. The converters 802 convert the frequency of the pulses 602, that is, the number of pulses 602 per unit of time, to a voltage with a defined scaling factor. In one embodiment, the output voltage of the converter 802 is directly related to the time between successive pulses 602. Accordingly, the output of the converters 802 is related to the value of the parameter being monitored and measured by the corresponding sending unit 100.

For the embodiment where the received signal 108-1 corresponds to engine RPMs, the resulting voltage from the converter 802-A is sent to a bargraph display unit 808-A and to an analog-to-digital convert (ADC) and 7-segment decoder 804-A, which is connected to an RPM LED display unit 808-C. The bargraph display unit 808-A produces the bar graph display 402-A that represents graphically the engine RPMs. The RPM LED display unit 808-C produces the numerical display 402-B that represents the engine RPMs. In the illustrated embodiment, the RPM LED display unit 808-C requires a 7-segment input, which is provided by the ADC and 7-segment decoder 804-A. Where the received signal 108-2 corresponds to vehicle speed, the resulting voltage from the converter 802-B is sent to an analog-to-digital convert (ADC) and 7-segment decoder 804-B, which is connected to an MPH LED display unit 808-B. The MPH LED display unit 808-B produces the numerical display 404 that represents the vehicle speed. The bargraph 808-A, the MPH LED display unit 808-B, the RPM LED display unit 808-C project the display 306 to the screen 304 and toward the vehicle occupant. Those skilled in the art will recognize that the display unit 228 is not limited to using LEDs as the illumination display and that the references to light emitting diodes (LEDs) are only for illustration.

Figure 9:
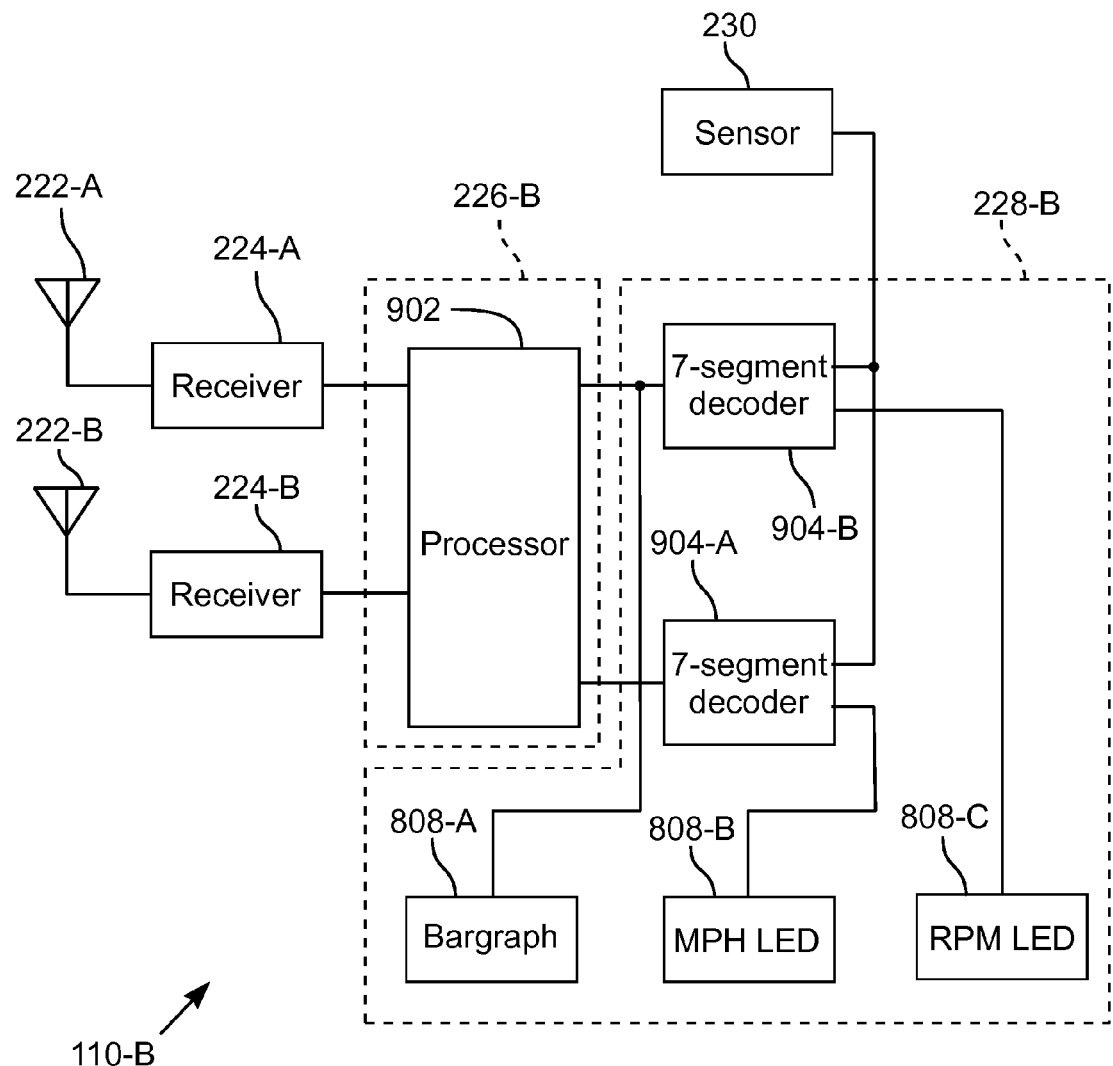
FIG. 9 is a block diagram of another embodiment of a receiving unit.

FIG. 9 illustrates a block diagram of another embodiment of a receiving unit 110-B. The illustrated embodiment shows a digital decoder unit 226-B and a digital display unit 228-B. The digital decoder unit 226-B is a processor 902 programmed to receive inputs from the receivers 224-A, 224-B, determine the time interval, or gap, 604 between successive pulses 602, and calculate the monitored parameter values.

In the embodiment in which a coded signal 108-B is transmitted by multiple sending units 100, the digital receiving unit 110-B includes a single receiver 224 that outputs a burst pulse 602 and the coded pulse stream 702 as it is received. The processor 902 stores the relative time and the identification code 704 for each burst pulse 602 and the coded pulse stream 702, and when a second burst pulse 602 with the same identification code 704 is received, the processor 902 calculates the monitored parameter value for the sending unit 100 with that identification code 704. That is, the processor 902 executes a program that stores a time stamp and the identification code 704 for each received burst pulse 602 and the coded pulse stream 702. The program also determines the time difference between the currently received signal 108-B and a previously received signal 108-B having the same identification code 704. The program then calculates the value of the measured parameter based on the time difference between two consecutive received signals 108 from the same sending unit 100.

The output of the processor 902 is connected to the digital display unit 228-B. For the embodiment where the received signal 108-A corresponds to engine RPMs, one output from the processor 902 is connected to a bargraph display unit 808-A and to a 7-segment decoder 904-A, which is connected to an RPM LED display unit 802-C. Another output from the processor 902 is connected to a 7-segment decoder 904-B, which is connected to an MPH LED display unit 802-B.

FIG. 9 also illustrates a sensor 230 that is connected to the 7-segment decoders 904 of the display unit 228-B. The sensor 230 is a photosensor that is responsive to the intensity of ambient light in the area surrounding the screen 304. In the illustrated embodiment, the 7-segment decoders 904 adjust the intensity of the illumination projected by the bargraph 808-A, and the RPM and MPH LEDs 808-C, 808-B based on the light intensity measured by the sensor 230.

As used herein, the processor 902 should be broadly construed to mean any computer or component thereof that executes software. In various embodiments, the processor 902 is one of a general purpose computer processor or a specialized device for implementing the functions of the invention. The processor 902 includes a memory medium that stores software and data, a processing unit that executes the software, and input/output (I/O) units for communicating with external devices. Those skilled in the art will recognize that the memory medium associated with the processor 902 can be either internal or external to the processing unit of the processor without departing from the scope and spirit of the present invention. The input component receives input from external devices, such as the receiver 224. The output component sends output to external devices, such as the display unit 228. The storage component stores data and program code. In one embodiment, the storage component includes random access memory and/or non-volatile memory.

Figure 10:
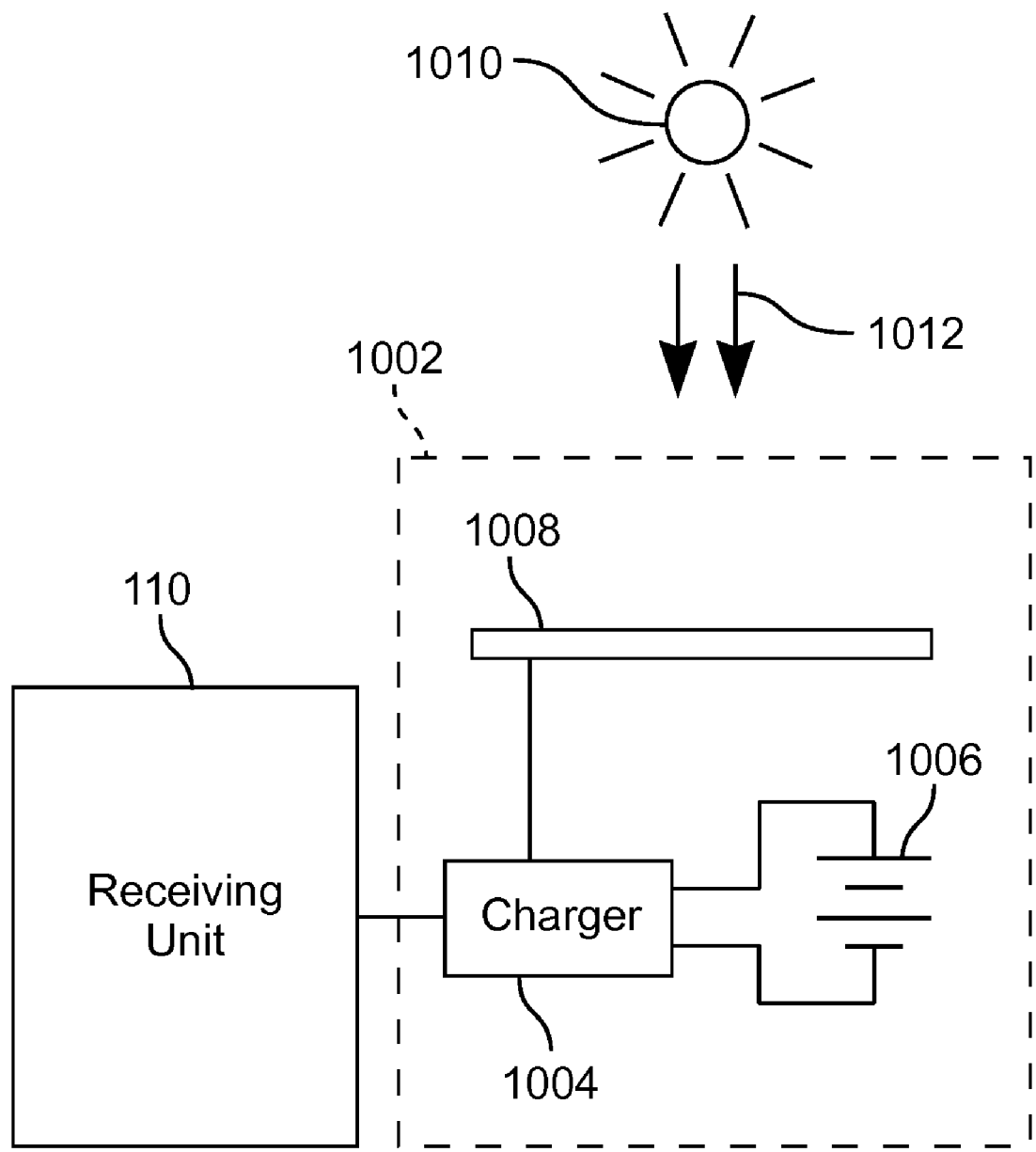
FIG. 10 is a block diagram of one embodiment of a receiving unit with a solar power source.

FIG. 10 illustrates a block diagram of one embodiment of a receiving unit 110 with a solar power source 1002. In the illustrated embodiment, the receiving unit 110 is connected to a solar power source 1002 that includes a charger 1004 that receives power from a solar cell 1008. The charger 1004 maintains the power level in the battery 1006 when there is more than sufficient light 1012 from the sun 1010 or other light source to meet the power demands of the receiving unit 110. The battery 1006 is sized to provide power to the receiving unit 110 when there is insufficient light 1012 available to meet the power demands of the receiving unit 110. One factor to consider in sizing the battery 1006 is that when there is insufficient light 1012 to power the receiving unit 110, the display unit 228 will be operating with reduce projection intensity, thereby operating with reduced power demand.

In the embodiment illustrated in FIG. 3, the receiving unit 110 is positioned on the dashboard 312 below the windshield 302. The illustrated location exposes the receiving unit 110 to sunlight 1012 coming through the windshield 302. Because of the exposure to sunlight 1012, the dashboard 302 is a suitable and convenient location for the solar power source 1002.

The wireless monitoring system 10 includes various functions. The function of providing power to the sending unit 100 is implemented, in one embodiment, by the interaction of the magnet 106 with the inductor 202 generating power that is stored in the storage device 204.

The function of generating power within the sending unit 100 is implemented, in one embodiment, by the inductor 202 being receptive to the magnetic field 112 of the magnet 106 such that the induced current in the inductor 202 is stored as energy available for use by the transmitter 206.

From the foregoing description, it will be recognized by those skilled in the art that a wireless monitoring system 10 has been provided. The system 10 includes a sending unit 100 that is self-powered by the movement of a magnet 106 relative to an inductor 202. That same magnet 106 also actuates a sensor 210 that triggers the transmitter 206 in the sending unit 100. The system 10 further includes a receiving unit 110 that is responsive to the signals 108 transmitted by the sending unit 100.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for a wireless monitoring system, said apparatus comprising:
   at least one transmitting unit including
      an inductor responsive to a magnetic field from a magnet attached to a moving component,
      a storage unit connected to said inductor, said storage unit storing energy generated from an interaction between said inductor and said magnet,
      a transmitter powered by said storage unit, and
      a sensor responsive to said magnet, said magnet causing said sensor to provide a trigger signal to said transmitter when said magnet is proximate said sensor, said trigger signal causing said transmitter to transmit a signal wirelessly, said transmitter receiving power from said storage unit to transmit said signal, said signal including a series of pulses with each pulse corresponding to when said magnet is positioned proximate to said sensor; and
   a receiving unit including
      a receiver responsive to said signal from said transmitter,
      a unit for decoding said signal received by said receiver, said unit determining a time value equal to a time difference between two successive signals from said transmitter, and
      a display unit for displaying a parameter value associated with said moving component, said parameter value related to said time value.

2. The apparatus of claim 1 wherein said display unit projects a display of said parameter value onto a screen, said screen positioned within a line of sight of a vehicle operator.

3. The apparatus of claim 1 wherein said signal includes an identification code identifying said transmitting unit.

4. The apparatus of claim 1 wherein said unit for decoding includes a processor that executes a program for processing said signal received by said receiver.

5. The apparatus of claim 1 wherein said at least one transmitting unit includes a first transmitting unit and a second transmitting unit; said signal associated with said first transmitting unit including information corresponding to a rotational speed of an engine in a vehicle; said signal associated with said second transmitting unit including information corresponding to a speed of said vehicle; and said receiving unit responsive to both first and second transmitting units.

6. The apparatus of claim 1 wherein said storage unit includes a capacitor storing energy generated from an interaction between said inductor and said magnet.

7. The apparatus of claim 1 wherein said storage unit includes a voltage multiplier.

8. The apparatus of claim 1 wherein said sensor positioned downstream of said inductor considering a direction of said magnet.

9. An apparatus for transmitting information within a wireless monitoring system, said apparatus comprising:
   an inductor responsive to a magnetic field from a magnet attached to a moving component;
   a storage unit connected to said inductor, said storage unit storing energy generated from an interaction between said inductor and said magnet;
   a transmitter powered by said storage unit; and
   a sensor responsive to said magnet, said transmitter triggered to transmit wirelessly a pulse when said magnet is positioned proximate to said sensor.

10. The apparatus of claim 9 wherein said transmitter transmits a coded pulse stream with said pulse, said coded pulse stream including an identification code identifying said apparatus.

11. The apparatus of claim 9 wherein said storage unit includes a capacitor that stores said stored energy.

12. The apparatus of claim 9 wherein said storage unit includes a voltage multiplier.

13. The apparatus of claim 9 wherein said sensor is a magnetic switch that is responsive to said magnet.

14. The apparatus of claim 9 wherein said sensor is positioned such that said magnet encounters said inductor before encountering said sensor.

15. An apparatus for transmitting information within a wireless monitoring system, said apparatus comprising:
   a first sending unit monitoring a first parameter;
   a second sending unit monitoring a second parameter, each one of said first and second sending units including
      an inductor responsive to a magnetic field from a magnet attached to a moving component,
      a storage unit connected to said inductor, said storage unit storing energy generated from an interaction between said inductor and said magnet,
      a sensor responsive to said magnetic field from said magnet,
      a transmitter sending a signal including a plurality of pulses corresponding to when said magnet is positioned proximate to said sensor, said transmitter receiving power from said storage unit to transmit said signal wirelessly; and
   a receiving unit responsive to said signal from each of first sending unit and said second sending unit, said receiving unit decoding a value of said first parameter and a value of said second parameter from said signals from said first sending unit and said second sending unit.

16. The apparatus of claim 15 wherein said receiving unit includes a first receiver responsive to said signal from said first sending unit and a decoding unit that decodes a time difference between consecutive pulses of said signal from said first sending unit.

17. The apparatus of claim 15 wherein said signal transmitted from each of said first sending unit and said second sending unit includes an identification code that permits said receiving unit to distinguish which of said first sending unit and said second sending unit is associated with a specific received signal.

18. The apparatus of claim 15 wherein said receiving unit includes a processor that executes a program for processing said signal received by said receiver, said program determining a time value equal to a time difference between two successive signals from one of said first sending unit and said second sending unit.

19. The apparatus of claim 15 wherein said storage unit includes a capacitor that stores said stored energy.

20. The apparatus of claim 15 wherein said storage unit includes a voltage multiplier.

* * * * *